Patented May 10, 1938

2,116,656

UNITED STATES PATENT OFFICE 2,116,656

MANUFACTURE OF A LOWER FATTY ACID ANHYDRIDE

Henry Dreyfus, London, England

No Drawing. Application July 18, 1934, Serial No. 735,787. In Great Britain August 23, 1933

15 Claims. (Cl. 260—123)

This invention relates to improvements in the manufacture of a lower fatty acid anhydride, and is particularly concerned with the production of acetic anhydride.

In U. S. specification No. 1,430,304 the manufacture of acetic anhydride is described by a process involving interaction of a salt of acetic acid, such as sodium acetate, and a salt of pyrosulphuric acid, such as sodium pyrosulphate. It is further stated that the reaction may be carried out in presence of a diluent, which may be acetic acid or acetic anhydride. Similarly, in U. S. specification No. 1,926,087, processes are described in which the anhydride results from the interaction of an acetate, such as sodium acetate, and of pyrophosphates, such as sodium pyrophosphate.

I have now found that pyrosulphates or pyrophosphates of ammonia or other volatile bases are also capable of effecting this reaction, and that the products of the reaction, apart from the anhydride, are readily capable of regeneration without the necessity for using up sulphuric acid or phosphoric acid. Thus in the manufacture of acid anhydride from sodium acetate and sodium pyrosulphate, two molecules of sodium acetate react with one molecule of pyrosulphate to make two molecules of sodium sulphate and one molecule of acetic anhydride. In order to convert the sodium sulphate back to pyrosulphate, it is necessary to add sulphuric acid so as to form the bisulphate, and heat the bisulphate to produce the pyrosulphate. Similar considerations apply in the case of employing pyrophosphates. In the new reaction, on the contrary, there may be produced, for example a mixture of ammonium sulphate and sodium sulphate, which on heating will readily produce sodium bisulphate which may be further heated to pyrosulphate without addition of sulphuric acid. The ammonia liberated on heating may of course be used again. From the point of the reaction to produce anhydride it is immaterial whether the ammonia or volatile base be combined with the acetic acid or other organic acid, or with the pyrosulphuric acid or pyrophosphoric acid.

According to the present invention, therefore, anhydrides of organic acids, and particularly of aliphatic acids, for instance acetic acid, are produced by reaction between a salt of the organic acid and a pyrosulphate or pyrophosphate, one of the reagents being a salt of ammonia or of a volatile organic base.

The reaction may be carried out as a cyclic process. For example ammonium acetate may be reacted with sodium pyrosulphate to produce a mixture of ammonium sulphate and sodium sulphate, together with acetic anhydride; the mixture of ammonium sulphate and sodium sulphate heated to drive off ammonia, which may be used to neutralize further quantities of acetic acid, and to form sodium bisulphate; and the sodium bisulphate further heated to form sodium pyrosulphate. The acetate or other salt of an organic acid used as starting material for the purposes of the invention should be substantially anhydrous. It is relatively immaterial whether a neutral salt, for instance neutral ammonium acetate, is used or an acid salt, for instance the acid salt of ammonia obtained by addition of one molecule of acetic acid to one molecule of ammonium acetate. In order to obtain anhydrous ammonium acetate without decomposition to acetamide, the drying should be carried out cautiously. It may be facilitated by means of a vacuum or by azeotropic methods. If desired, the water may be driven from ammonium acetate by means of a liquid whose vapour forms an azeotropic mixture with water and which will serve as a diluent in the subsequent production of the anhydride. Such liquids are, for example, benzene, toluene, xylene and certain chlorinated hydrocarbons such as dichlorethylene and ethylene dichloride.

Preferably the reaction between the acetate and the pyrosulphate or pyrophosphate is effected in presence of a diluent, for example a diluent of a hydrocarbon or chlorinated hydrocarbon character as previously referred to, or any other diluent which is inert to the reaction, for example the acid corresponding to the anhydride being produced or the anhydride itself. The reaction may be effected at very moderate temperatures, for example temperatures up to 100 or 140° C. It may conveniently be effected at the boiling point of the diluent employed. If desired, the pyrosulphate or pyrophosphate and the acetate or other organic acid salt may be allowed to react for some considerable period, preferably in the presence of the diluent, and subsequently the acetic anhydride or other aliphatic or other organic acid anhydride distilled from the reaction mixture. Regeneration of the products of the reaction other than the anhydride may then be carried out as previously described.

As indicated above, the new process may be carried out with mixtures of pyrosulphates or pyrophosphates of ammonia or other volatile base with an acetate or other organic acid salt of a non-volatile base such as soda or potash, or with mixtures of the acetate or other organic acid salt of ammonia or other volatile base with a pyrosulphate or pyrophosphate of a non-volatile base. In the above examples of suitable mixtures, any one volatile base may be replaced wholly or in part by another volatile base. As volatile bases other than ammonia, primary, secondary or tertiary acyclic or cyclic bases, for example methylamine, dimethylamine, trimethylamine and ethylamine, propylamine and iso-amylamine and the corresponding di- and tri-alkylamines and pyridine, may be employed.

The following example illustrates the process of the invention but it is to be understood that this example is given solely by way of illustration and is in no way limitative.

*Example*

Anhydrous neutral ammonium acetate is mixed with anhydrous sodium pyrosulphate, in the proportion of two molecules of acetate to one of pyrosulphate, and sufficient glacial acetic acid is added to give the mixture the consistency of a thin paste.

The mixture is heated under a reflux for one to two hours after which the acetic acid present and the acetic anhydride formed are distilled off. The temperature is then raised until ammonia is evolved from the dry residue, which consists of a mixture of sodium and ammonium sulphates, the ammonia being absorbed in acetic acid. When no more ammonia is evolved the temperature is raised still more so that the sodium bisulphate formed during the removal of the ammonia is changed into sodium pyrosulphate.

What I claim and desire to secure by Letters Patent is:—

1. Process for the manufacture of the anhydride of a lower fatty acid, which comprises subjecting to reaction, under the action of heat at a temperature of 100 to 140° C., a salt of said lower fatty acid and a pyrosalt selected from the group consisting of pyrosulphates and pyrophosphates, one of the reactants being a salt of a nitrogen-containing volatile base selected from the group consisting of ammonia and the amines and the other a salt of a non-volatile base.

2. Process for the manufacture of the anhydride of a lower fatty acid, which comprises subjecting to reaction, under the action of heat, a salt of a lower fatty acid and a pyrosalt selected from the group consisting of pyrosulphates and pyrophosphates, one of the reactants being a salt of a nitrogen-containing volatile base selected from the group consisting of ammonia and the amines and the other a salt of an alkali metal.

3. Process for the manufacture of the anhydride of a lower fatty acid, which comprises subjecting to reaction, under the action of heat, an ammonium salt of a lower fatty acid and an alkali metal pyrosalt selected from the group consisting of pyrosulphates and pyrophosphates.

4. Process for the manufacture of the anhydride of a lower fatty acid, which comprises subjecting to reaction, under the action of heat and in presence of an inert liquid, a salt of said lower fatty acid and a pyrosalt selected from the group consisting of pyrosulphates and pyrophosphates, one of the reactants being a salt of a nitrogen-containing volatile base selected from the group consisting of ammonia and the amines and the other a salt of an alkali metal.

5. Process for the manufacture of the anhydride of a lower fatty acid, which comprises subjecting to reaction, under the action of heat and in presence of the concentrated lower fatty acid, an ammonium salt of said lower fatty acid and an alkali metal pyrosalt selected from the group consisting of pyrosulphates and pyrophosphates.

6. Process for the manufacture of the anhydride of a lower fatty acid, which comprises subjecting to reaction, under the action of heat at temperatures of 100 to 140° C., a salt of a lower fatty acid and a pyrosalt selected from the group consisting of pyrosulphates and pyrophosphates, one of the reactants being a salt of a nitrogen-containing volatile base selected from the group consisting of ammonia and the amines and the other a salt of an alkali metal.

7. Process for the manufacture of the anhydride of a lower fatty acid, which comprises subjecting to reaction, under the action of heat at temperatures of 100 to 140° C. and in presence of a concentrated lower fatty acid, an ammonium salt of a lower fatty acid and an alkali metal pyrosalt selected from the group consisting of pyrosulphates and pyrophosphates.

8. Process for the manufacture of acetic anhydride, which comprises subjecting to reaction, under the action of heat at a temperature of 100 to 140° C., two salts, one an acetate and the other a pyrosalt selected from the group consisting of pyrosulphates and pyrophosphates, one of the said reactants being a salt of a nitrogen-containing volatile base selected from the group consisting of ammonia and the amines and the other a salt of a non-volatile base.

9. Process for the manufacture of acetic anhydride, which comprises subjecting to reaction, under the action of heat, an acetate and a pyrosalt selected from the group consisting of pyrosulphates and pyrophosphates, one of the reactants being a salt of a nitrogen-containing volatile base selected from the group consisting of ammonia and the amines and the other a salt of an alkali metal.

10. Process for the manufacture of acetic anhydride, which comprises subjecting to reaction, under the action of heat ammonium acetate and an alkali metal pyrosalt selected from the group consisting of pyrosulphates and pyrophosphates.

11. Process for the manufacture of acetic anhydride, which comprises subjecting to reaction, under the action of heat and in presence of a diluent, an acetate and a pyrosalt selected from the group consisting of pyrosulphates and pyrophosphates, one of the reactants being a salt of a nitrogen-containing volatile base selected from the group consisting of ammonia and the amines and the other a salt of an alkali metal.

12. Process for the manufacture of acetic anhydride, which comprises subjecting to reaction, under the action of heat and in presence of glacial acetic acid ammonium acetate and an alkali metal pyrosalt selected from the group consisting of pyrosulphates and pyrophosphates.

13. Process for the manufacture of acetic anhydride, which comprises subjecting to reaction, under the action of heat at temperatures of 100 to 140° C., an acetate and a pyrosalt selected from the group consisting of pyrosulphates and pyrophosphates, one of the reactants being a salt of a nitrogen-containing volatile base selected from the group consisting of ammonia and the amines and the other a salt of an alkali metal.

14. Process for the manufacture of acetic anhydride, which comprises subjecting to reaction, under the action of heat at temperatures of 100 to 140° C. and in presence of glacial acetic acid, ammonium acetate and an alkali metal pyrosalt selected from the group consisting of pyrosulphates and pyrophosphates.

15. Process for the manufacture of acetic anhydride, which comprises subjecting to reaction, in a medium of boiling glacial acetic acid, a mixture of ammonium acetate and sodium pyrosulphate, distilling off the acetic acid and the acetic anhydride produced, decomposing the residue to produce ammonia and sodium bisulphate and thereafter heating the sodium bisulphate to produce sodium pyrosulphate.

HENRY DREYFUS.